US012598414B2

(12) United States Patent
Margalit

(10) Patent No.: US 12,598,414 B2
(45) Date of Patent: Apr. 7, 2026

(54) SYSTEM AND METHOD FOR GENERATING AN AUDIO SIGNAL

(71) Applicant: SONICEDGE LTD., Shoham (IL)

(72) Inventor: Mordehai Margalit, Zichron Yaaqov (IL)

(73) Assignee: SONICEDGE LTD., Shoham (IL)

( * ) Notice: Subject to any disclaimer, the term of this patent is extended or adjusted under 35 U.S.C. 154(b) by 133 days.

(21) Appl. No.: 18/542,851

(22) Filed: Dec. 18, 2023

(65) Prior Publication Data

US 2024/0205590 A1 Jun. 20, 2024

Related U.S. Application Data

(60) Provisional application No. 63/433,507, filed on Dec. 19, 2022.

(51) Int. Cl.
*H04R 1/20* (2006.01)

(52) U.S. Cl.
CPC ...................................... *H04R 1/20* (2013.01)

(58) Field of Classification Search
CPC ........ H04R 1/20; H04R 1/403; H04R 19/005; H04R 19/02; H04R 2217/03
See application file for complete search history.

(56) References Cited

U.S. PATENT DOCUMENTS

| | | | |
|---|---|---|---|
| 8,861,752 B2 | 10/2014 | Margalit | |
| 10,284,961 B2 | 5/2019 | Margalit | |
| 2016/0021466 A1* | 1/2016 | Pompei ................. | B06B 1/0292 310/309 |
| 2016/0277838 A1 | 9/2016 | Kuperschmidt et al. | |
| 2016/0277845 A1 | 9/2016 | Kuperschmidt et al. | |
| 2016/0286319 A1* | 9/2016 | Kupershmidt ......... | H04R 19/02 |
| 2016/0360320 A1 | 12/2016 | Margalit | |
| 2016/0360321 A1 | 12/2016 | Margalit | |
| 2017/0064457 A1* | 3/2017 | Kupershmidt ......... | H04R 19/02 |
| 2021/0067865 A1* | 3/2021 | Margalit ................ | H04R 19/02 |

* cited by examiner

*Primary Examiner* — Jason R Kurr
(74) *Attorney, Agent, or Firm* — Manelli Selter PLLC; Edward Stemberger

(57) ABSTRACT

Techniques described herein generally relate to generating an audio signal with a speaker device. The speaker device includes a first conductive layer with a plurality of center structures and springs; a second conductive layer with a plurality of perforations; and electrical isolation rings; a third conductive layer with a plurality of center structures and springs; and a dielectric layer. The first, second and third conductive layers are in physical contact with the dielectric layer and are electrically isolated from each other.

16 Claims, 14 Drawing Sheets

SYSTEM AND METHOD FOR GENERATING AN AUDIO SIGNAL

TECHNICAL FIELD

The present disclosure generally relate to systems and methods for generating an audio signal. In some examples the system and methods of generating an audio signal are applied in a mobile, wearable, or portable device. In other examples the system and methods of generating an audio signal are applied in earphones, headsets, hearables, or hearing aids.

BACKGROUND OF THE DISCLOSURE

U.S. Pat. No. 8,861,752 describes a picospeaker which is a novel sound generating device and a method for sound generation. The picospeaker creates an audio signal by generating an ultrasound acoustic beam which is then actively modulated. The resulting modulated ultrasound signal has a lower acoustic frequency sideband which corresponds to the frequency difference between the frequency of the ultrasound acoustic beam and the modulation frequency. US 20160360320 and US 20160360321 describe MEMS architectures for realizing the picospeaker. US 20160277838 describes one method of implementation of the picospeaker using MEMS processing. US 20160277845 describes an alternative method of implementation of the picospeaker using MEMS processing.

State of art approaches to realizing the picospeaker are complex and require many processing steps. Hence it is desirable to provide an architecture and method of implementation which reduces the complexity and number of processing steps.

GLOSSARY

"acoustic signal"—as used in the current disclosure means a mechanical wave traversing either a gas, liquid or solid medium with any frequency or spectrum portion between 10 Hz and 10,000,000 Hz.

"audio" or "audio spectrum" or "audio signal"—as used in the current disclosure means an acoustic signal or portion of an acoustic signal with a frequency or spectrum portion between 10 Hz and 20,000 Hz.

"speaker" or "pico speaker" or "micro speaker" or "nano speaker"—as used in the current disclosure means a device configured to generate an acoustic signal with at least a portion of the signal in the audio spectrum.

"membrane"—as used in the current disclosure means a flexible structure constrained by at least two points.

"blind"—as used in the current disclosure means a structure with at least one acoustic port through which an acoustic wave traverses with low loss.

"shutter"—as used in the current disclosure means a structure configured to move in reference to the blind and increase the acoustic loss of the acoustic port or ports.

"acoustic medium"—as used in the current disclosure means any of but not limited to; a bounded region in which a material is contained in an enclosed acoustic cavity; an unbounded region where in which a material is characterized by a speed of sound and unbounded in at least one dimension. Examples of acoustic medium include but are not limited to; air; water; ear canal; closed volume around ear; air in free space; air in tube or other acoustic channel.

SUMMARY

Some embodiments of the present disclosure may generally relate to a speaker device that includes a membrane and a shutter. The membrane is positioned in a first plane and configured to oscillate along a first directional path and at a first frequency effective to generate an ultrasonic acoustic signal. The shutter is positioned in a second plane that is substantially separated from the first plane. The shutter is configured to modulate the ultrasonic acoustic signal such that an audio signal is generated.

Other embodiments of the present disclosure may generally relate to a speaker device comprising an array of membranes and shutters. The array of membranes and shutters operate either independently or driven by a common source. Examples of drive signals include but are not limited to; pulse width modulation and modulated sinusoidal signals. The driving unit is a semiconductor integrated circuit which includes; a communication unit; a charge pump configured to generate a high voltage signal; a switching unit configured to modulate the high voltage signal. The driving unit receives a digital sound data stream and an operating voltage and outputs driving signals for the membrane, and shutter. In some embodiments the membrane and shutter operate asynchronously and or independently of each other at one or more frequencies. In other embodiments the membrane and shutter operate synchronously at the same frequency. In the synchronous mode of operation, the amplitude of the audio signal is controlled by any of but not limited to; the relative phase of the membrane and shutter operation; the amplitude of the shutter operation; the amplitude of the membrane operation; any combination of these.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

Figure 1A:
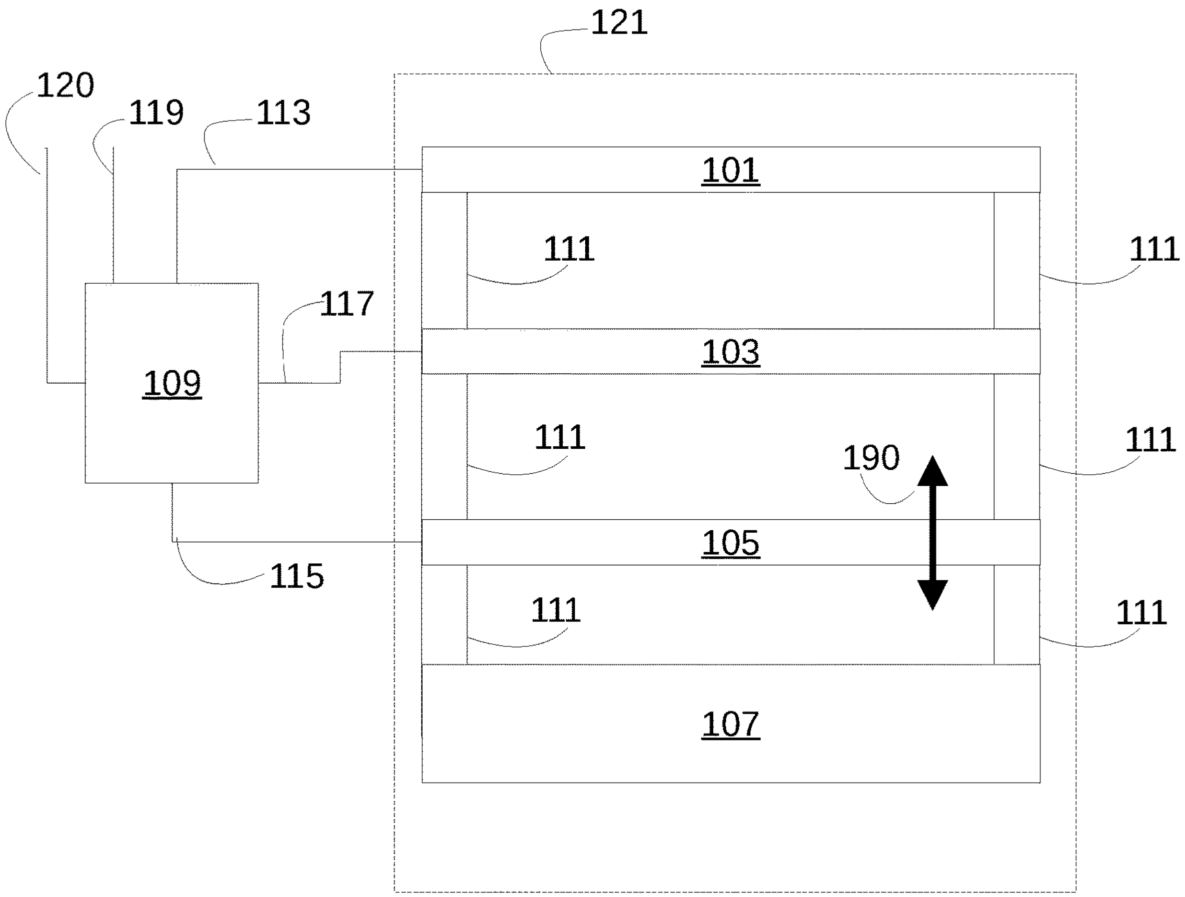
FIG. 1A PRIOR ART
FIG. 1A is an example of a side view of a state of art architecture for a MEMs picospeaker cell.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other examples may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure. This disclosure is drawn, inter alia, to methods, apparatus, computer programs, and systems of generating an audio signal.

In an embodiment, the speaker device includes a first conductive layer with a plurality of center structures and springs; a second conductive layer with a plurality of perforations; and electrical isolation rings; a third conductive layer with a plurality of center structures and springs; and a dielectric layer. The first, second and third conductive layers are in physical contact with the dielectric layer and are electrically isolated from each other.

In some examples, a speaker device is described that includes a membrane and a shutter. The membrane is configured to oscillate along a first directional path and at a combination of frequencies with at least one frequency effective to generate an ultrasonic acoustic signal. A shutter and blind are positioned proximate to the membrane. In one non limiting example the membrane, the blind, and the shutter may be positioned in a substantially parallel orientation with respect to each other. In other examples the membrane, the blind, and the shutter may be positioned in the same plane and the acoustic signal is transmitted along acoustic channels leading from the membrane to the shutter. In a further example the modulator and or shutter are composed of more than one section.

In some embodiments, the membrane is driven by an electric signal that oscillates at a frequency Ω and hence moves at b Cos(2π*Ωt), where b is the amplitude of the membrane movement, and t is time. The electric signal is further modulated by a portion that is derived from an audio signal a(t). The acoustic signal is characterized as:

$$s(t) = ba(t)\mathrm{Cos}(2\pi^*\Omega t) \tag{1}$$

Applying a Fourier transform to Equation (1) results in a frequency domain representation $$S(f) = b/2 * [A(f-\Omega) + A(f+\Omega)] \tag{2}$$

Where A(f) is the spectrum of the audio signal. Equation (2) describes a signal with an upper and lower side band around a carrier frequency of Ω. Applying to the acoustic signal of Equation (1) an acoustic modulator operating at frequency Ω results in $$S(t) = ba(t)\mathrm{Cos}(2\pi^*\Omega t)(l + m\mathrm{Cos}(2\pi^*\Omega t)) \tag{3}$$

Where l is the loss of the modulator and m is the modulation function and due to energy conservation l+m<1. In the frequency domain $$S'(f) = b/4 * [mA(f) + mA(f+2\Omega) + A(f-\Omega) + A(f+\Omega)] \tag{4}$$

Where b/4*m A(f) is an audio signal. The remaining terms are ultrasound signals where m A(f+2Ω) is at twice the modulation frequency and A(f−Ω)+A(f+Ω) is the original unmodulated signal. Additional acoustic signals may be present due to any but not limited to the following; ultrasound signal from the shutter movement; intermodulation signals due to nonlinearities of the acoustic medium; intermodulation signals due to other sources of nonlinearities including electronic and mechanical.

In a further example the audio signal is enhanced by acoustic radiation pressure of the ultrasound signal. This is a new approach to audio generation where the audio system generates an ultrasound signal. The ultrasound signal exerts a radiation force on surfaces on which it impinges including the Tympanic membrane (ear drum). By modulating the ultrasound signal the radiation force magnitude can be changed, thereby effecting mechanical movement of the Tympanic membrane which is registered as sound by the ear (and brain). The radiation pressure of an acoustic signal is well documented and given as $$P = \alpha E = \alpha\frac{p^2}{\rho c^2} \tag{5}$$

Where P is the radiation pressure, and where E, p, ρ, and c are energy density of the sound beam near the surface, acoustic pressure, density of the sound medium, and the sound velocity, respectively. α is a constant related to the reflection property of the surface. If all the acoustic energy is absorbed on the surface, α is equal to 1, while for the surface that reflects all the sound energy, α is 2. The sound power E carried by the beam is E=W/c where W is the power density of the transducer. In one example to effect an audio sensation at the ear drum an ultrasound signal is modulated with an audio signal. The audio signal causes changes in the acoustic radiation force which are registered as an audio signal by the ear. In one non limiting example the audio is AM modulated on the ultrasound carrier $$S(t) = \mathrm{Cos}(2\pi^*\Omega t)(l + ma(t)) \tag{6}$$

E is proportional to m a(t) and the changes in the radiation force P are proportional to m a(t) resulting in movement of the eardrum which is proportional to m a(t). Hence an ultrasound speaker can generate sound using any or both methods described above. In one example the methods are used intermittently, in another example the methods are used concurrently, in another example only modulation or only radiation force are used.

Figure 1B:
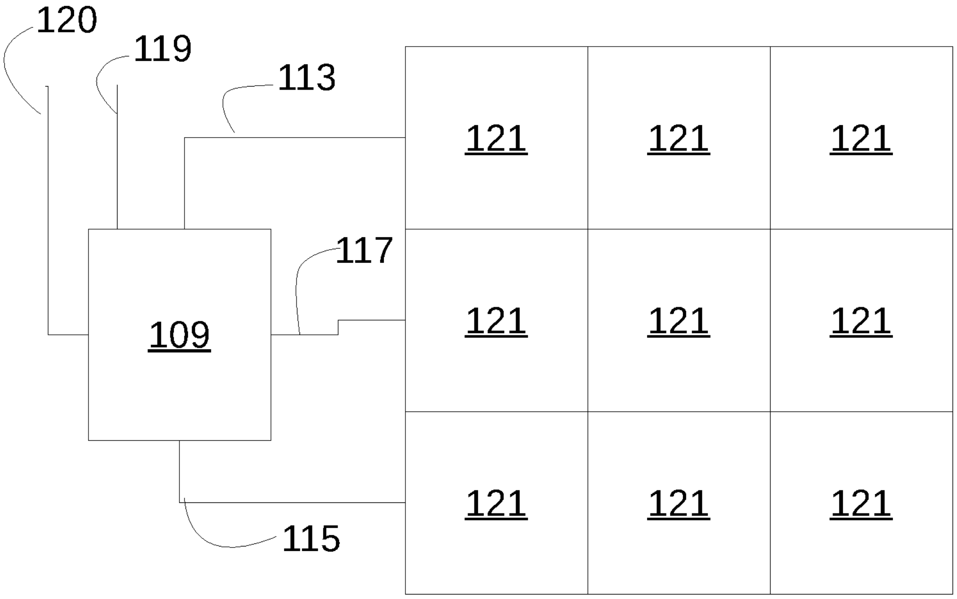
FIG. 1B PRIOR ART
FIG. 1B is an example of a top view of a matrix arrangement of a plurality of cells adapted from US 20160277845.

FIG. 1A is an example of a side view of a state of art architecture for a MEMs picospeaker cell (121). The picospeaker cell is composed of at least three layers. Membrane (105), which generates the acoustic signal described in Equation (1) by moving in the direction of arrows (190). Blind (103) and shutter (101) move relative to each other and modulate the acoustic signal as described in Equation (3). In one example driving device (109) provides one voltage signal to membrane (105) and a second voltage signal to shutter (101) and the voltage to blind (103) is set at zero or ground. The first and second voltage signals provide the driving force to generate the acoustic sound of Equation (1) and the modulation function of Equation (3) respectively. In an additional example a fourth layer; handle (107) is included. The driving device (109) is electrically connected to a digital audio source via line (119), low voltage source via line (120), membrane layer (105) via line (115), blind layer (103) via line (117) and shutter layer (101) via line (113). The picospeaker device is composed of multiple picospeaker cells (121). FIG. 1B is an example of a top view of a matrix arrangement of a plurality of cells (121) adapted from US 20160277845 the content of which is hereby incorporated into this specification by reference. The cells (121) are electrically connected in parallel so that a first drive voltage is applied to all membranes (FIG. 1A 105) in the connected cells (121) and a second drive voltage is applied to all shutters (FIG. 1A 101) in the connected cells (121).

Figure 2A:
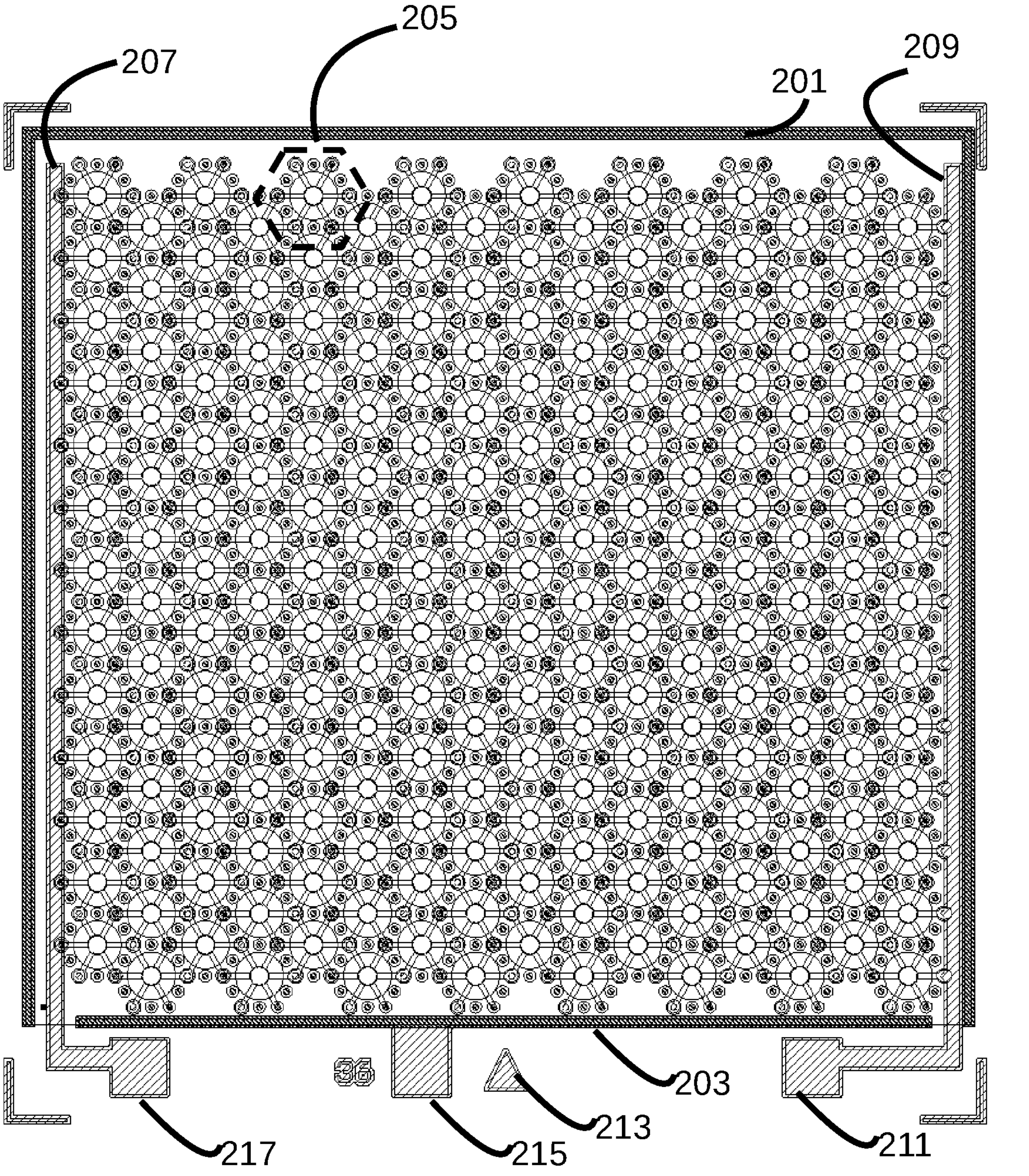
FIG. 2A is an example of a top view of picospeaker with a simplified process flow comprising multiple, electrically interconnected picospeaker cells.

FIG. 2A is an example of a top view of picospeaker with a simplified process flow comprising multiple, electrically interconnected picospeaker cells (205) which will be described in FIG. 2B. Each of the three layers described in FIG. 1, membrane, shutter and blind, is electrically connected to at least one electrical pad (211, 215, 217). A voltage applied on one pad will be the applied voltage to the membrane layer, a voltage applied to a second pad will be the voltage applied to the shutter layer and a zero voltage or ground applied to a third pad will be the voltage applied to the blind. In alternative examples, the voltages and ground may be applied to any combination of layers. In a further example; pad (211) is in electrical contact with bus (209) which is connected to any of the membrane, blind or shutter layers; pad (215) is in electrical contact with bus (203) which is connected to any of the membrane, blind or shutter layers; and pad (217) is in electrical contact with bus (207) which is connected to any of the membrane, blind or shutter layers. In a further example additional pads and/or busses may provide electrical connection to any of the membrane; shutter or blind layers. In a further example, any of the membrane; blind and or shutter layers are composed of one or more electrically isolated portions so that a pad would only connect to a portion of said layer. This would enable operating only a partial number of picospeaker cells. In a further example the picospeaker includes a frame (201). The frame connects the blind layer to the substrate and prevents leakage of air from below the blind to above the blind from the sides of the blind. Hence a frame provides an air tight closure between blind and substrate. Electrical bus (203) is an example of a pad connected to a frame and providing both air tight connection as well as electrical connection to blind layer. In a further example a picospeaker includes visible markings (213). Examples of markings include but are not limited to; die alignment or position mark; die dicing marks; die number mark; logos or other markings; any combination of these marks. In a further example a frame (201, 203) covers at least any of but not limited to more than 50%; more than 70%; more than 90%; more than 95% of the perimeter of the blind membrane layer.

Figure 2B:
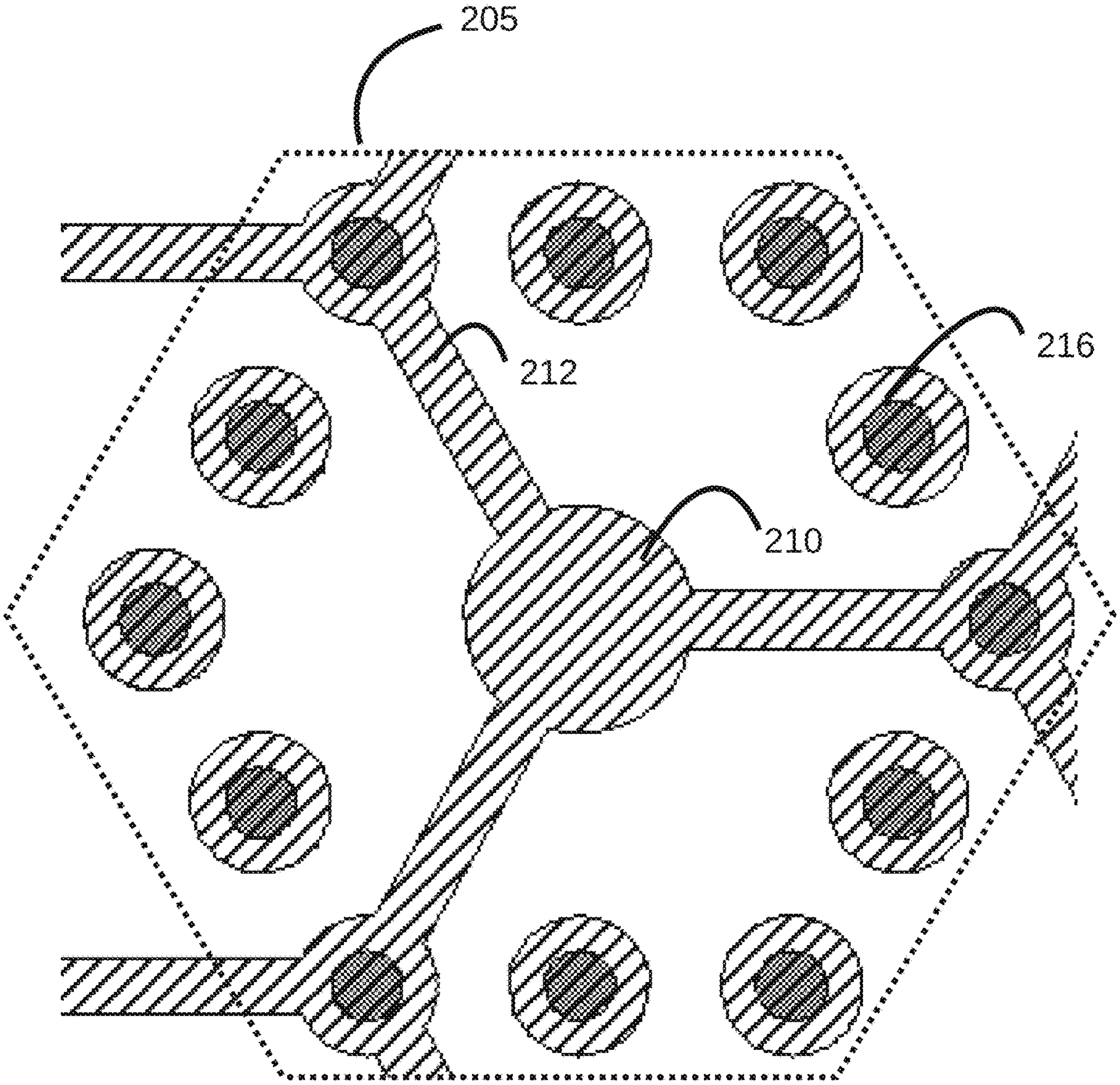
FIG. 2B and FIG. 2C are an example of membrane and shutter layers respectively of a picospeaker cell from FIG. 2A.
Figure 2C:
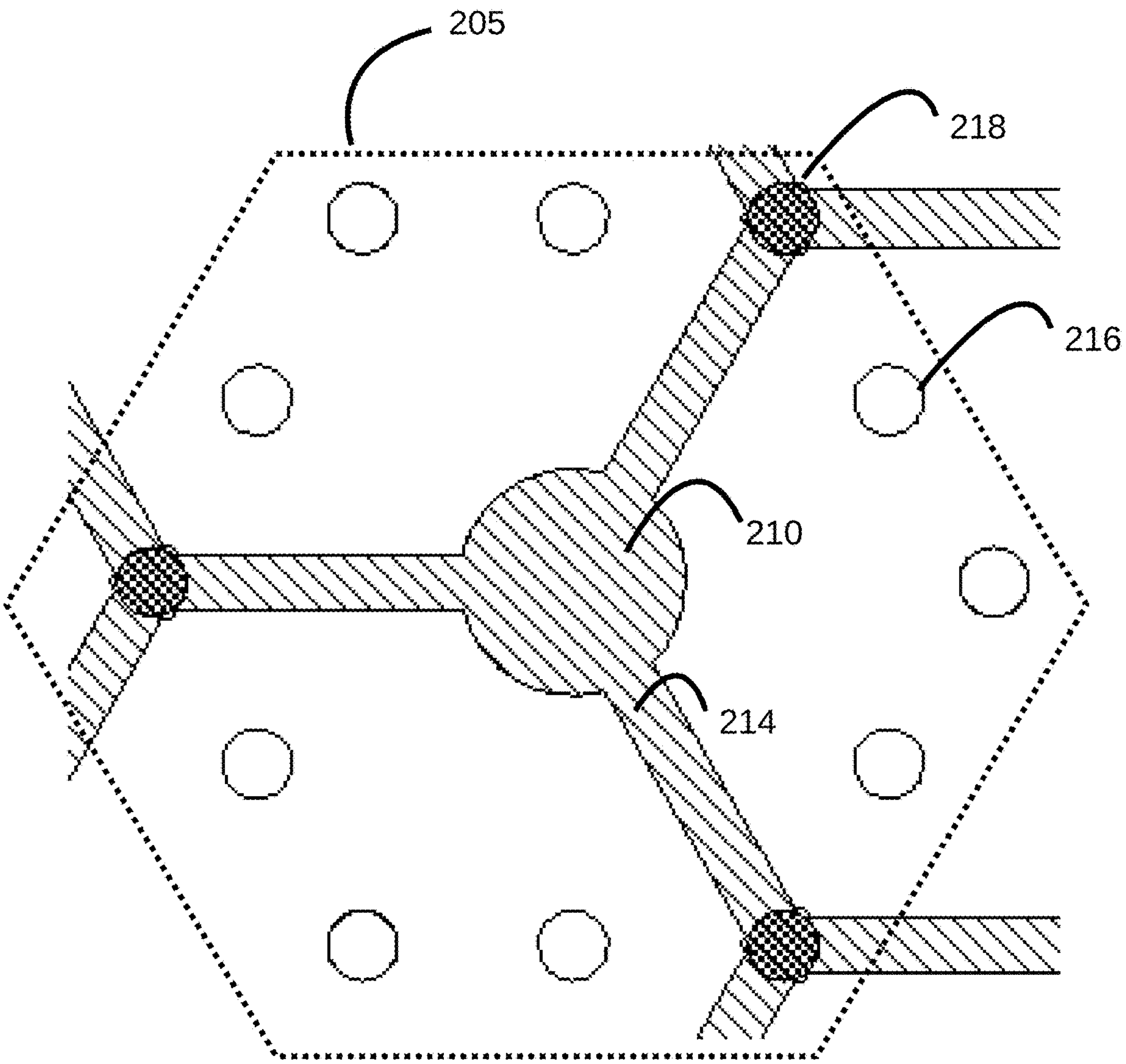
Figure 2D:
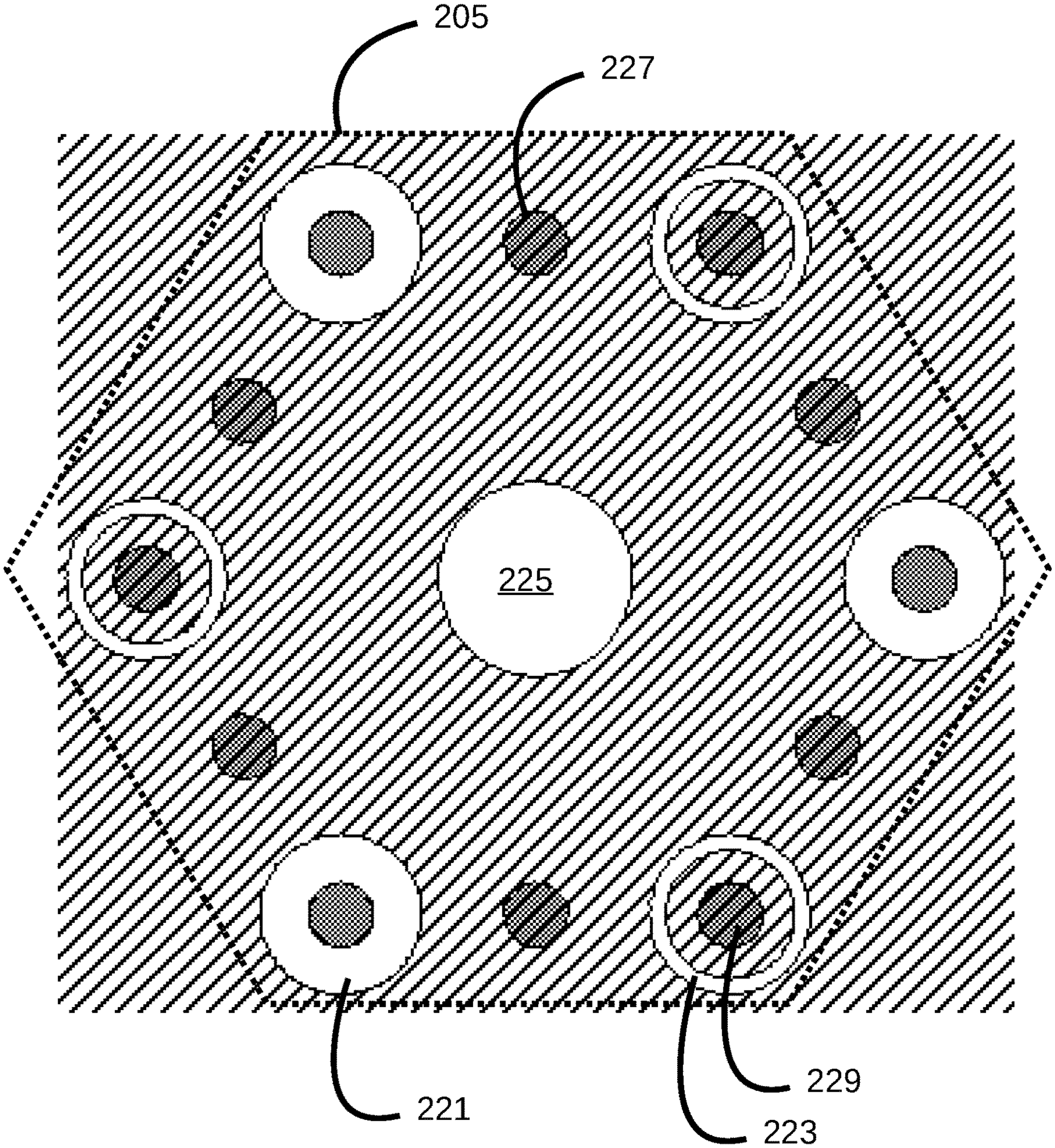
FIG. 2D is an example of a blind layer of a picospeaker cell from FIG. 2A.

FIG. 2B and FIG. 2C are an example of membrane and shutter layers respectively of a picospeaker cell (205) from FIG. 2A. Membrane and shutter layer are comprised as central structures (210) with springs (212, 214). In one example membrane and shutter structures are similar in size and form. In an alternative example membrane and shutter structures differ in size or form, and the structure with the lower mechanical resonance frequency is designated as the shutter. In a further example the structure has any off but not limited to 1; 2; 3; 4; 5; 6; 7; 8 spring structures. A central structure is any off but not limited to rectangle; triangle; square; hectogon; hexagon; heptagon; octagon; circle; or any radially symmetric shape. The central structure at least partially overlaps a perforation in the blind layer. The overlap defines the modulation factor m of equation (2). In a further example the overlap extends over at least 50% of the perimeter of the perforation and has a width of any off but not limited to 1-3 micron;2-4 micron; 3-5 micron; 4-6 micron; 5-10 micron; 10 to 15 micron. Examples of springs (212, 214) include but are not limited to straight beams; S shaped springs; U shaped springs; zig zag shaped springs or any shape connecting any anchor (e.g. 216, 218) to the central structure (210). The spring and central structure comprise a mechanical structure with a mechanical resonant frequency of any of but not limited to; less than 200 KHz; 200-300 KHz; 300-400 KHz; above 400 KHz; above 600 KHz; above 1 MHz. Anchor (216, 218) structures provide mechanical support and scaffolding for a membrane; blind or shutter layer which maintains electrical isolation between the layers. Anchor structures (216) extend over all anchors for bottom layer; and over a smaller portion of anchor structures in consecutive layers. As a further example, in FIG. 2C a top layer with only three anchors (218) is demonstrated. FIG. 2D is an example of a blind layer of a picospeaker cell (205) from FIG. 2A. In one example a blind layer is situated between shutter and membrane layers. Blind layer includes at least one or more perforation (225); isolation ring (223); and anchor (227) for blind layer. Isolation ring (223) electrically isolates blind layer from anchor (229) of layer located above blind layer. Isolation ring (223) prevents electrical connection between blind layer and layer located above it while enabling mechanical support of layer above blind layer and electrical connection from layer above blind layer to respective electrical pad or pads. In a further example, blind layer includes an additional capacitance reduction perforation (221) located above anchor of layer below blind layer. Capacitance reduction perforation (221) area is any of but not limited to smaller than 5 micron; square; 10 micron square; 20 micron square; 40 micron square; 60 micron square.

Figure 3A:
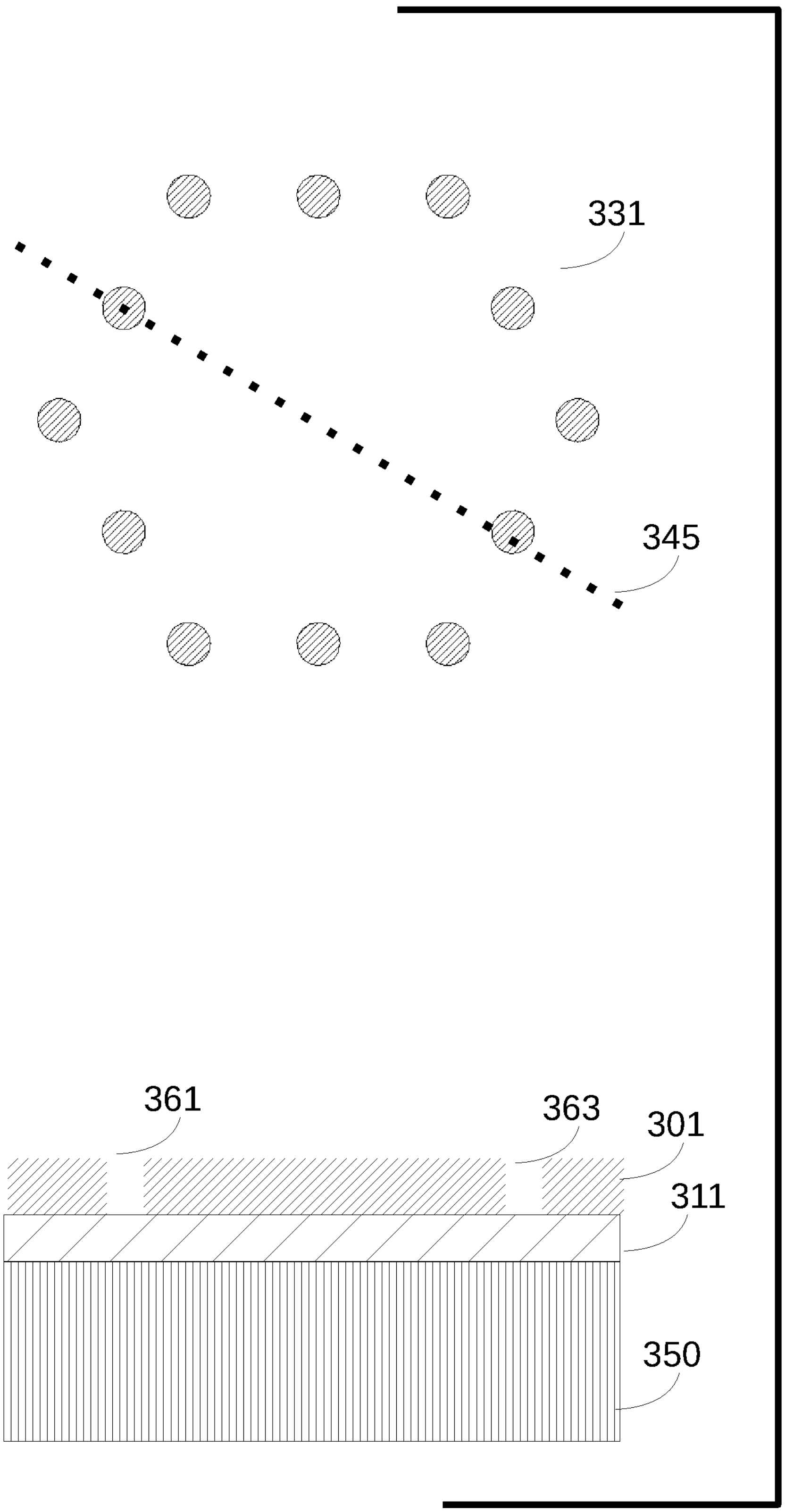
FIG. 3A is an example of a top view of cell and cutout along line of a picospeaker cell during fabrication.
Figure 3B:
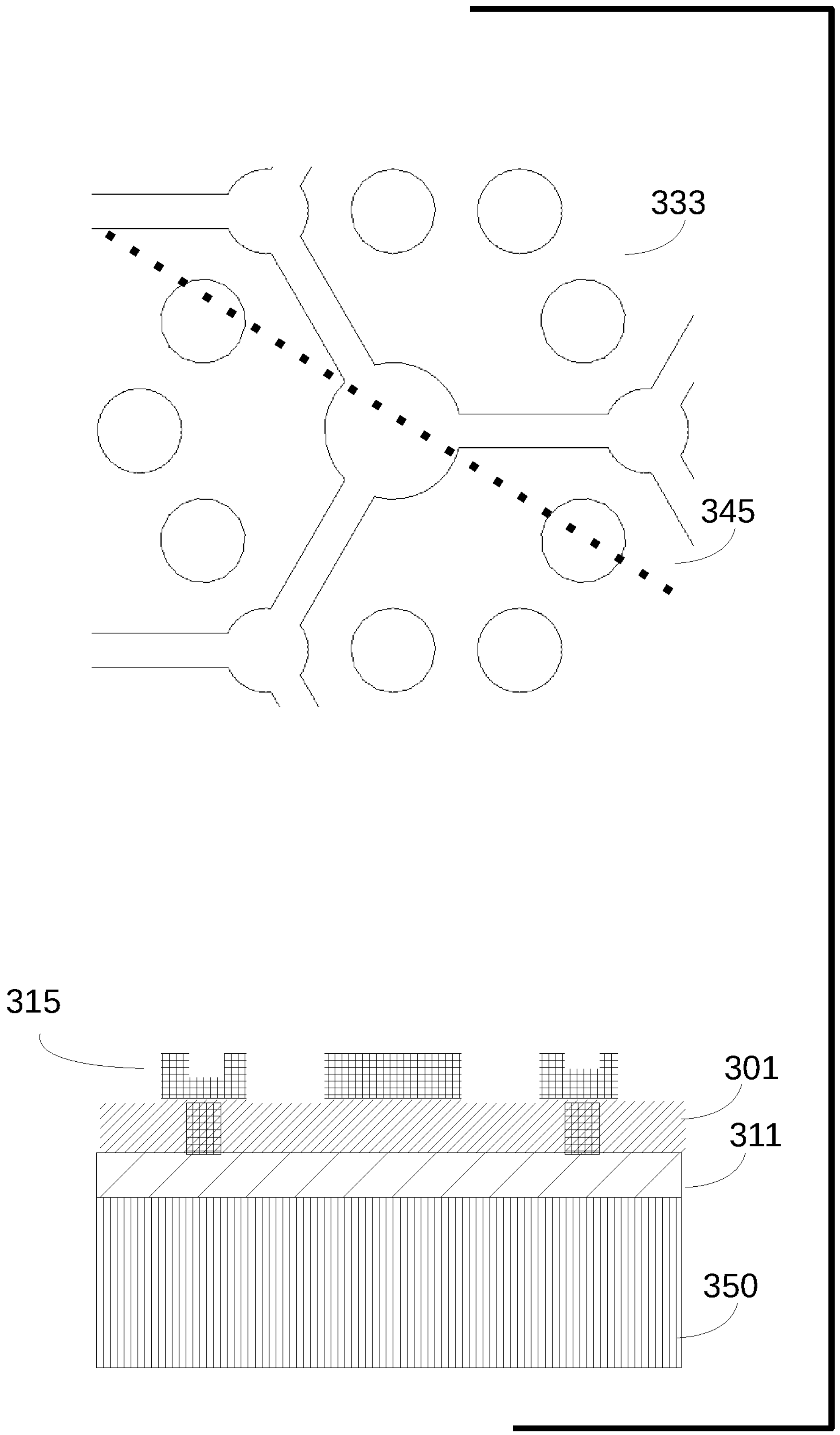
FIG. 3B depicts resulting holes for pillar support in second dielectric layer.
Figure 3C:
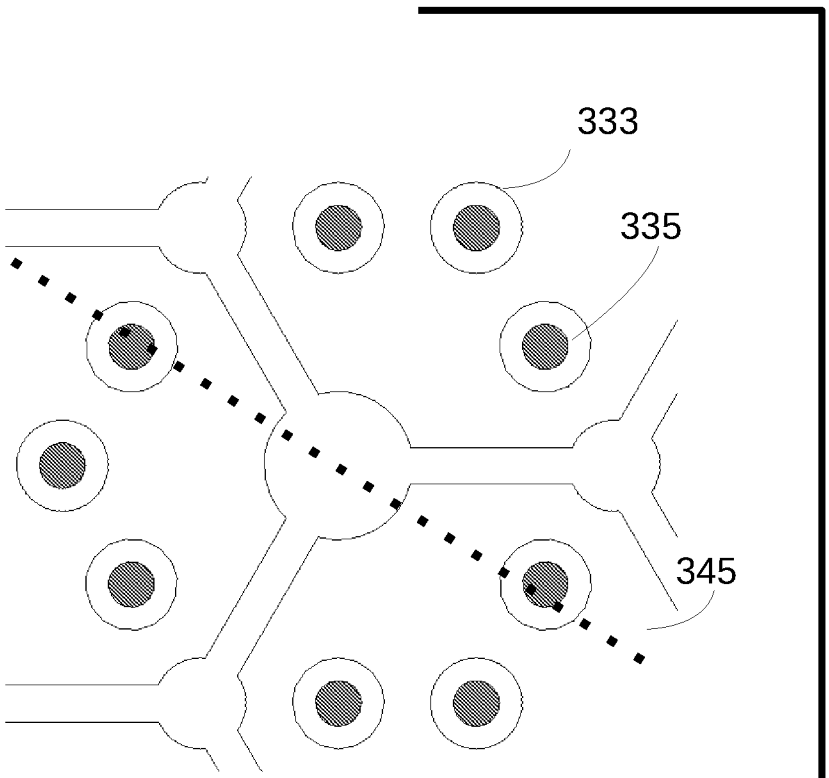
FIG. 3C shows a third dielectric layer deposited above first conductive layer.
Figure 3C:
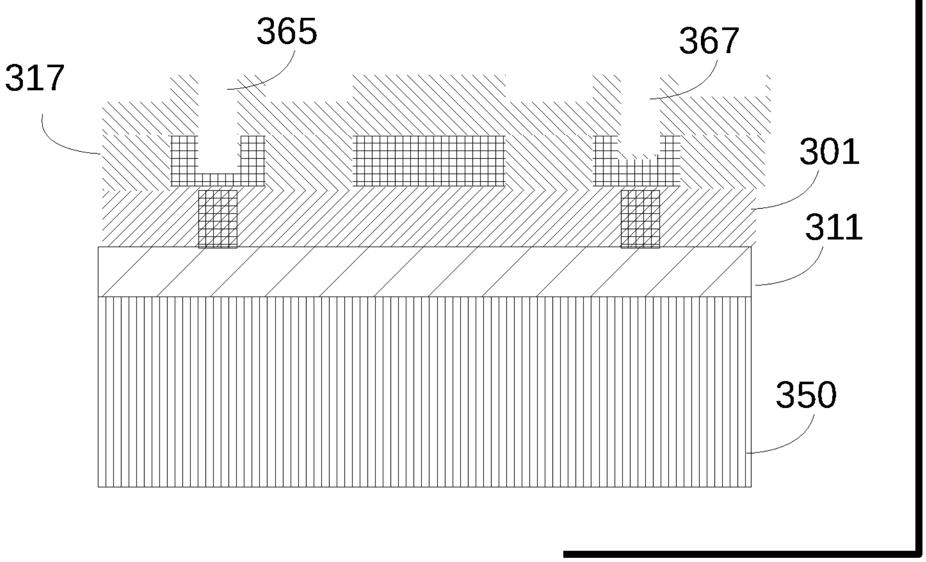
Figure 3D:
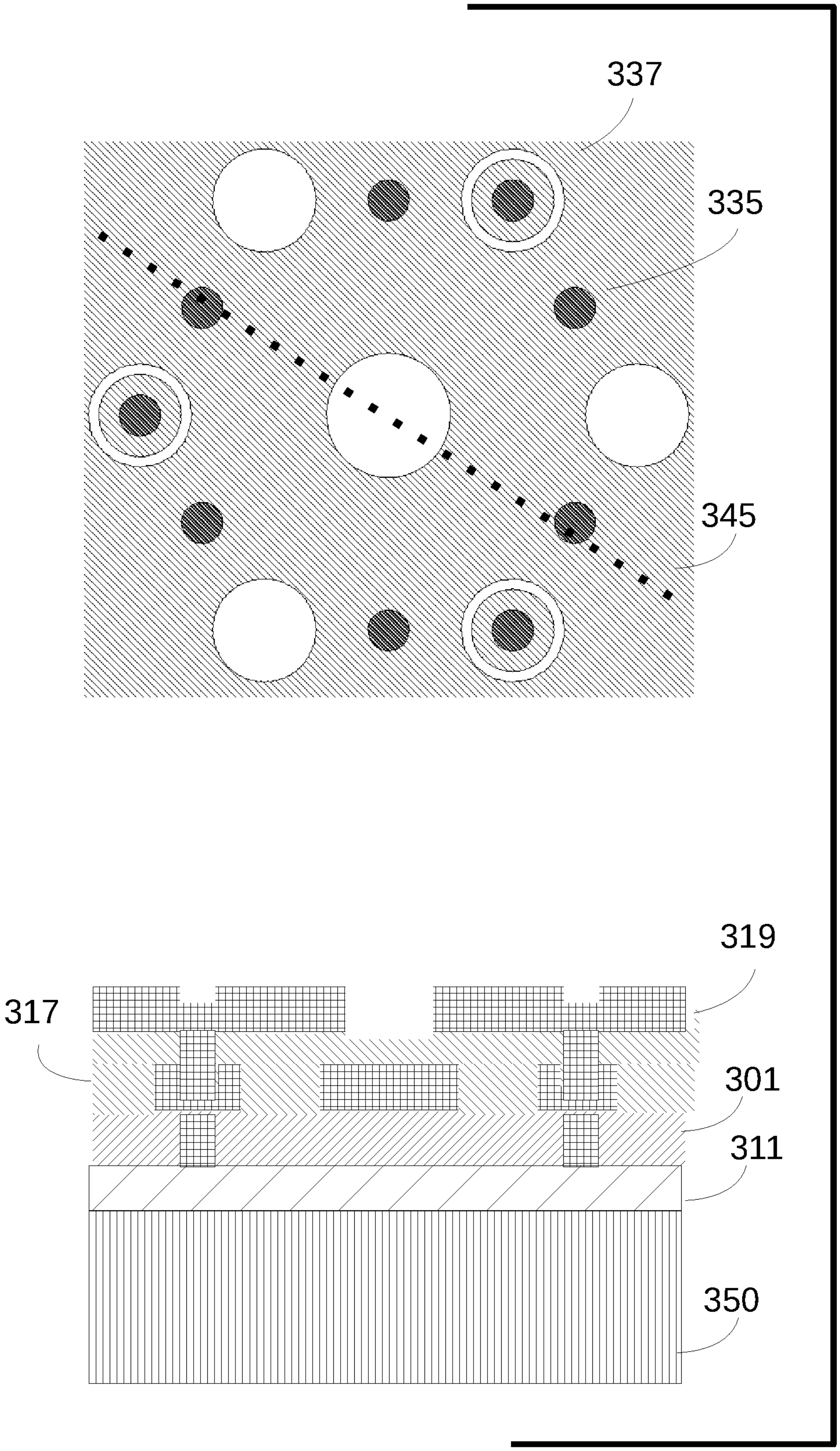
FIG. 3D shows resulting holes for pillar support in third dielectric layer.
Figure 3E:
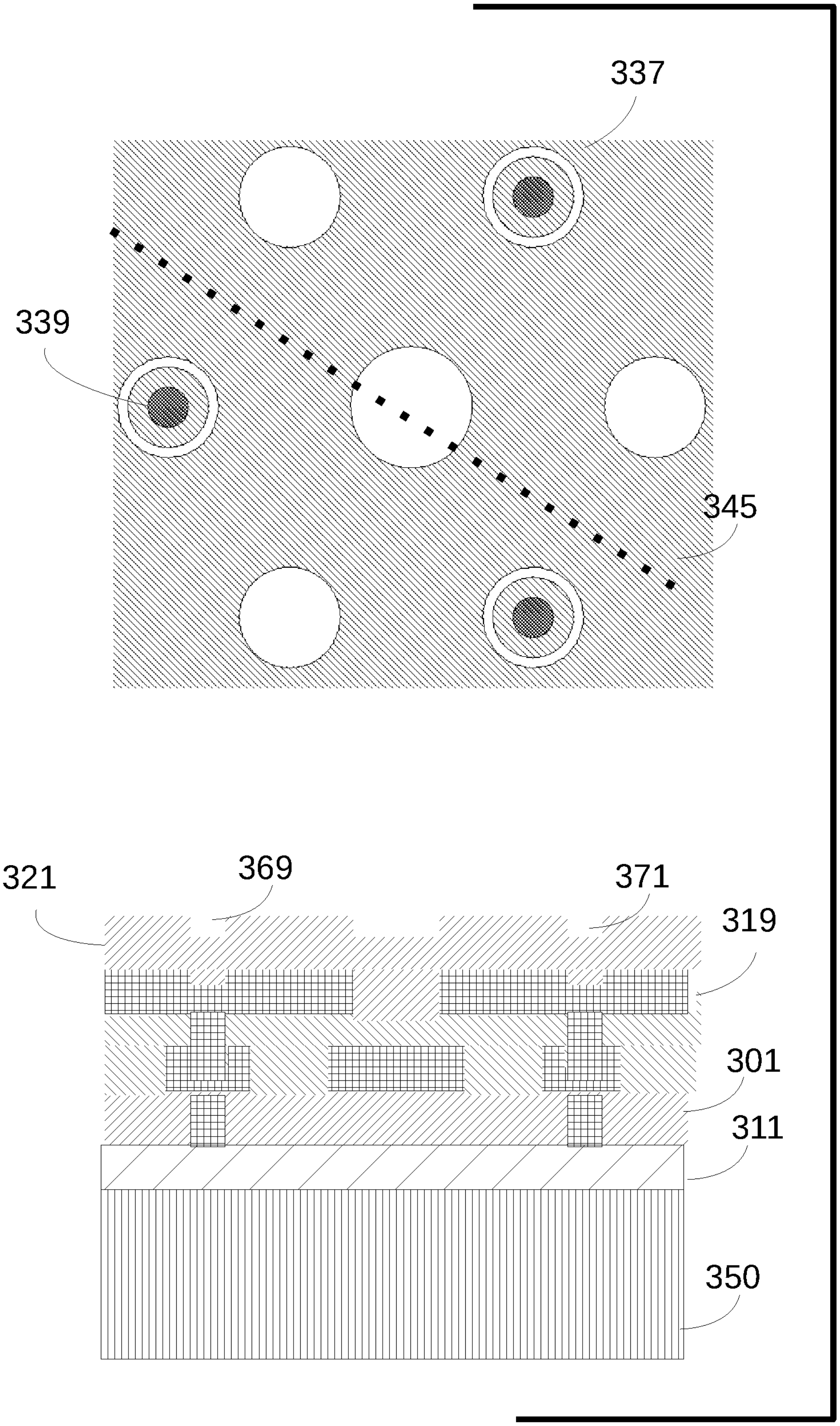
FIG. 3E shows a fourth dielectric layer deposited above second conductive layer.
Figure 3F:
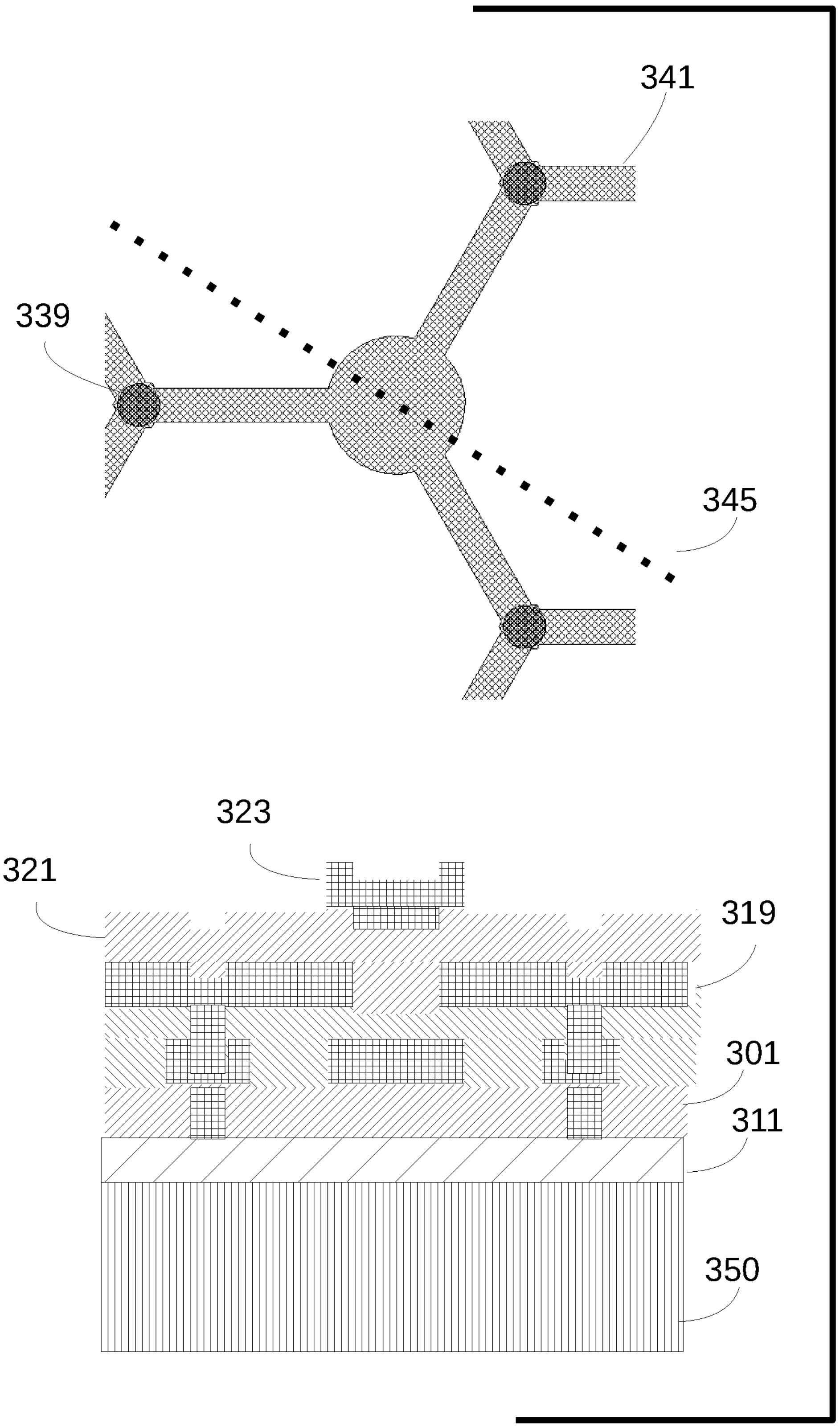
FIG. 3F depicts resulting holes for pillar support in fourth dielectric layer.
Figure 3G:
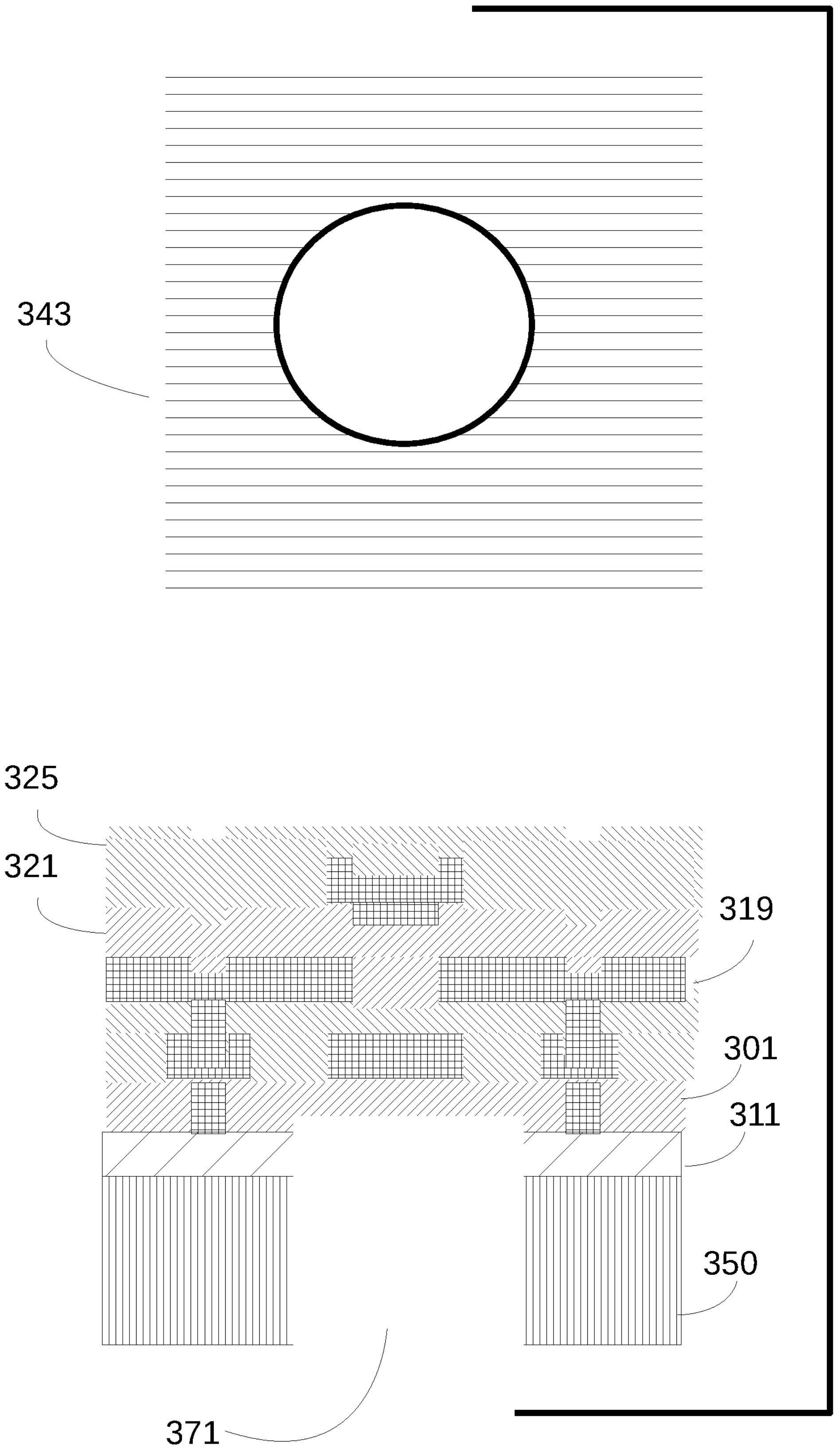
FIG. 3G depicts a fifth dielectric layer deposited on third conductive layer.

FIGS. 3A-3G are an example of a simplified process flow for fabrication of a picospeaker. FIG. 3A is an example of a top view of cell (331) and cutout along line (345) of a picospeaker cell during fabrication after conducting the following processing steps; a silicon wafer (350) is coated with a first dielectric layer (311) and a second dielectric layer (301). A first dielectric layer (311) is comprised of dielectric materials with an etch selectivity in respect to second dielectric layer (301). Examples of materials for a first dielectric layer include but are not limited to SiN; SiRN; TiF; TaF; AlOx; AlN; TiO;TaO; SiO2; thermal SiO2; or combinations of these materials. In a further example a first dielectric layer is termed base dielectric and is characterized by a resistance to etch by HF and or VHF. A second dielectric (301) is a member of the dielectric stack comprising the sacrificial material or layers and they will be removed at the final stage of the process by a sacrificial etch. Examples of sacrificial etch include but are not limited to HF; VHF; Plasma Ashing; XeFe. Second dielectric layer (301) is patterned as shown in top view. Patterning is conducted by depositing a photo resist; exposing a mask pattern; developing said photoresist to exhibit said mask pattern; etching dielectric layer using the developed photoresist to isolate areas from etching. Examples of etching include but are not limited to wet etching including HF; VHF; dry etching including mechanical and chemical plasma etching; mechanical ion etching. The mask pattern is composed of holes, where each hole will provide the defining structure for support pillars. Support pillars can have any shape including but not limited to round; ellipse; rectangle; or multi-faceted shape. Area of support pillar is any of but not limited to; smaller than 10 micron square; smaller than 20 micron square; smaller than 50 micron square; smaller than 100 micron square. FIG. 3B depicts resulting holes for pillar support (FIG. 3A, 361, 363) will be filled with a first conducting layer (315) deposited above second dielectric layer (301). First conducting layer is patterned similarly to previous description with a deposited photoresist; exposure with mask; developing of photoresist; and etching of first conducting layer with pattern (333) creating both support structures; central structure and springs (FIG. 2B). In a further example photoresist includes a hard photo resist comprised of an intermediate non organic material which is first patterned using developed photoresist and then provides etch resistant layer for defining etch pattern. FIG. 3C describes a third dielectric layer (317) deposited above first conductive layer (315). In one example third dielectric layer is comprised of same material as second dielectric material (301) and further comprises part of sacrificial material stack. Third dielectric layer (317) is patterned similarly to previous description with a deposited photoresist; exposure with mask; developing of photoresist; and etching of third dielectric layer with pattern (335) defining holes for support structures. FIG. 3D depicts resulting holes for pillar support (FIG. 3C, 365, 367) will be filled with a second conductive layer (319) deposited above third dielectric layer (317). Second conductive layer (319) is patterned similarly to previous description with a deposited photoresist; exposure with mask; developing of photoresist; and etching of first conducting layer with pattern (333) creating both perforated structures as shown in (FIG. 2D). In a further example photoresist includes a hard photo resist comprised of an intermediate non organic material which is first patterned using developed photoresist and then provides etch resistant layer for defining etch pattern. FIG. 3E describes a fourth dielectric layer (321) deposited above second conductive layer (319). In one example fourth dielectric layer (321) is comprised of same material as second dielectric material (301) and further comprises part of sacrificial material stack. Fourth dielectric layer (321) is patterned similarly to previous description with a deposited photoresist; exposure with mask; developing of photoresist; and etching of third dielectric layer with pattern (337) defining holes (339) for support structures. FIG. 3F depicts resulting holes for pillar support (FIG. 3E 369, 371) will be filled with a third conductive layer (323) deposited above fourth dielectric layer (321). Third conductive layer (323) is patterned similarly to previous description with a deposited photoresist; exposure with mask; developing of photoresist; and etching of first conducting layer with pattern (341) creating both center structure and spring as shown in (FIG. 2C). In a further example photoresist includes a hard photo resist comprised of an intermediate non organic material which is first patterned using developed photoresist and then provides etch resistant layer for defining etch pattern. FIG. 3G depicts a fifth dielectric layer (325) deposited on third conductive layer (FIG. 3E 323). In a further example fifth dielectric layer (325) is comprised of the same dielectric material as second dielectric material (301) and comprises part of the sacrificial material stack. Silicon wafer (350) is patterned according to back side etch mask pattern (343). Silicon wafer etch is either DRIE etch or wet etch. Etch masks include photoresist or hard mask as described previously.

Figure 4:
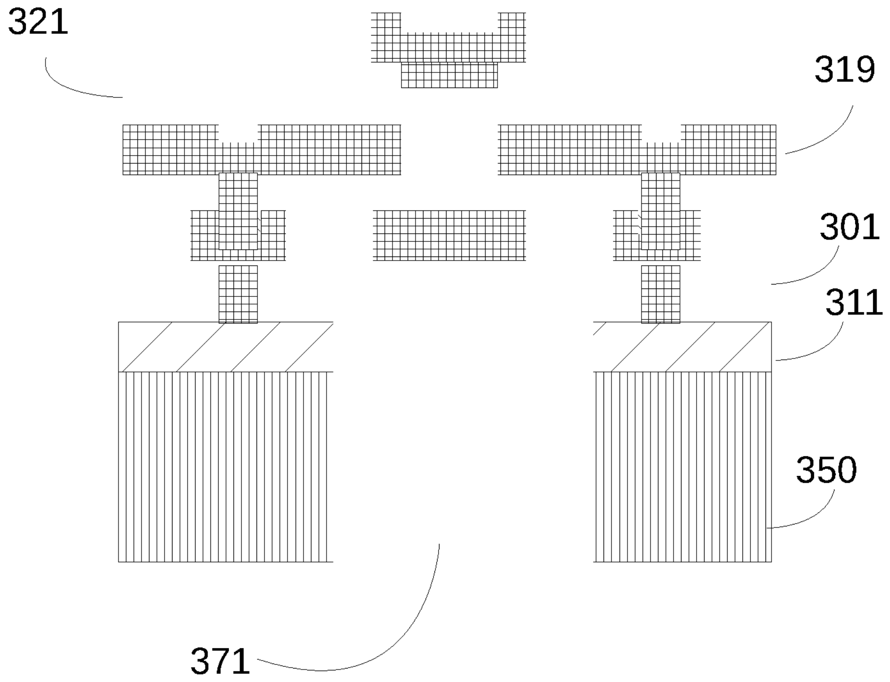
FIG. 4 depicts a cutout along the center of a picospeaker cell of FIGS. 3A-3G.

FIG. 4 describes a cutout along the center of a picospeaker cell as described in FIGS. 3A-3G, after removing the sacrificial layer using a sacrificial layer etch. Examples of etch include and are not limited to HF; VHF; Plasma Ashing; XeFe. Examples of sacrificial layers include but are not limited to SiO2; SiOx; aSi; polymers. Examples of conductive layer materials include but are not limited to; doped Polysilicon; metals including Al; AlCu; AlSiCu; Nickel. Conductive materials can include a bottom and or top layer of dielectric material including SiN; SiRN; TiF; TiO; AlOx and combinations of these. In a further example, prior to a backside etch, a pad reveal pattern is defined to provide a mask for etching the dielectric layers two to five to expose pads (FIG. 2A 211, 215, 217). A pad metal is deposited on exposed pads. In one example pad metal definition is done using either lift off process (deposition of photo resist; exposure of mask; developing of photo resist with opening for pads; deposition of metal; and removal of photoresist leaving metal just on pads). In an alternative example metal pads are defined by metal layer deposition; photoresist deposition exposure; developing and then etching metal layer according to developed photo resist. Example of metal pads include but are not limited to Al; AlCu; AlSiCu; Gold; Ti; Cr; Nickel or combinations of these materials.

In a further example thickness ranges (all numbers are in microns) for the layers are shown in the table

| Layer | Min thickness | Max thickness | Typical thickness |
|---|---|---|---|
| First dielectric layer | 0.1 | 2.0 | 0.2 |
| Second dielectric layer | 0.1 | 6.0 | 1.0 |
| First conductive layer | 0.2 | 5.0 | 1.5 |
| Third dielectric layer | 1.0 | 6.0 | 2.5 |
| Second conductive layer | 0.2 | 10.0 | 2.0 |
| Fourth dielectric layer | 1.0 | 6.0 | 2.5 |
| Third conductive layer | 0.2 | 5.0 | 1.5 |
| Fifth dielectric layer | 0.1 | 5.0 | 1.0 |

To sum we present a speaker device comprised of a first conductive layers with a plurality of center structures and springs; a second conductive layer with a plurality of perforations; and electrical isolation rings; a third conductive layer with a plurality of center structures and springs; a dielectric layer; wherein first, second and third conductive layers are in physical contact with dielectric layer and are electrically isolated from each other. In a further example the second conductive layer is physically connected to dielectric layer at its perimeter with at least 70 percent of its perimeter and restricts airflow from bottom side second conductive layer to top side of second conductive layer to substantially a set of perforations in the second conductive layer. In a further example second conductive layer is physically connected to dielectric layer at its perimeter with any of but not limited to at least 60 percent; at least 80 percent; at least 90 percent; of its perimeter and restricts airflow from bottom side second conductive layer to top side of second conductive layer to substantially a set of perforations in the second conductive layer. In a further example the conductive layers are any of but not limited to polysilicon; doped polysilicon; Al; AlCu; AlSiCu; Ni. In further example the stress in the conductive layer is tensile. In a further example the stress in the conductive layer is any of but not limited to; less than 30 Mpa; less than 50 Mpa; Less than 100 Mpa; Less than 300 Mpa. In a further example the conductance of the conductive layer is any of but not limited to less than 10 Ohm per square; less than 50 Ohm per square; less than 500 Ohm per square; less than 1 KOhm per square. In a further example the dielectric layer material is any of SiN; SiRN; TiN; TaO; TaN; AlOx; SiO2.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.". Speaker and picospeaker are interchangeable and can be used in in place of the other.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A speaker device comprising:

a first conductive layer with a plurality of first center structures and first springs coupled to the first center structures;

a second conductive layer with a plurality of perforations; and electrical isolation rings;

a third conductive layer with a plurality of second center structures and second springs coupled to the second center structures; and a dielectric layer;

wherein the first, second and third conductive layers are in physical contact with the dielectric layer and are electrically isolated from each other.

2. The speaker device of claim 1, wherein the second conductive layer is physically connected to the dielectric layer at its perimeter with at least 70 percent of its perimeter and is constructed and arranged to restrict airflow from a bottom side of the second conductive layer to a top side of the second conductive layer to substantially a set of perforations in the second conductive layer.

3. The speaker device of claim 1, wherein the second conductive layer is physically connected to the dielectric layer at its perimeter with any of at least 60 percent; at least 80 percent; at least 90 percent of its perimeter and restricts airflow from a bottom side of the second conductive layer to a top side of the second conductive layer to substantially a set of perforations in the second conductive layer.

4. The speaker device of claim 1, wherein the conductive layers are any of polysilicon; doped polysilicon; Aluminum (Al); Aluminum-Copper alloys (AlCu); Aluminum-Silicon-Copper alloys (AlSiCu); or Nickel (Ni).

5. The speaker device of claim 1 wherein the dielectric layer material is any of silicon mononitride (SiN); silicon-rich nitride (SiRN); titanium nitride (TiN); tantalum oxide (TaO); tantalum nitride (TaN); aluminum oxide (AlOx); or silicon dioxide (SiO2).

6. The speaker device of claim 1, wherein each of the first and second center structures has a radially symmetric shape.

7. The speaker device of claim 1, wherein the first springs and first center structures comprise a first mechanical structure with a mechanical resonant frequency of one of: less than 200 KHz; 200-300 KHz; 300-400 KHz; above 400 KHz; above 600 KHz; or above 1 MHz.

8. The speaker device of claim 1, wherein the second springs and second center structures comprise a second mechanical structure with a mechanical resonant frequency of one of: less than 200 KHz; 200-300 KHz; 300-400 KHz; above 400 KHz; above 600 KHz; or above 1 MHz.

9. A speaker device comprising:

a first conductive layer with a plurality of first center structures and first springs coupled to the first center structures;

a second conductive layer with a plurality of perforations; and electrical isolation rings;

a third conductive layer with a plurality of second center structures and second springs coupled to the second center structures; and a dielectric layer;

a substrate, wherein the substrate and dielectric includes at least one through hole; and wherein the first, second and third conductive layers are in physical contact with the dielectric layer and are electrically isolated from each other.

10. The speaker device of claim 9, wherein the second conductive layer is physically connected to the dielectric layer at its perimeter with at least 70 percent of its perimeter and is constructed and arranged to restrict airflow from a bottom side of the second conductive layer to a top side of the second conductive layer to substantially a set of perforations in the second conductive layer.

11. The speaker device of claim 9, wherein the second conductive layer is physically connected to the dielectric layer at its perimeter with any of at least 60 percent; at least 80 percent; at least 90 percent of its perimeter and restricts airflow from a bottom side of the second conductive layer to a top side of the second conductive layer to substantially a set of perforations in the second conductive layer.

12. The speaker device of claim 9, wherein the conductive layers are any of polysilicon; doped polysilicon; Aluminum (Al); Aluminum-Copper alloys (AlCu); Aluminum-Silicon-Copper alloys (AlSiCu); or Nickel (Ni).

13. The speaker device of claim 9 wherein the dielectric layer material is any of silicon mononitride (SiN); silicon-rich nitride (SiRN);

titanium nitride (TiN); tantalum oxide (TaO); tantalum nitride (TaN); aluminum oxide (AlOx); or silicon dioxide (SiO2).

14. The speaker device of claim 9, wherein each of the first and second center structures has a radially symmetric shape.

15. The speaker device of claim 9, wherein the first springs and first center structures comprise a first mechanical structure with a mechanical resonant frequency of one of: less than 200 KHz; 200-300 KHz; 300-400 KHz; above 400 KHz; above 600 KHz; or above 1 MHz.

16. The speaker device of claim 9, wherein the second springs and second center structures comprise a second mechanical structure with a mechanical resonant frequency of one of: less than 200 KHz; 200-300 KHz; 300-400 KHz; above 400 KHz; above 600 KHz; or above 1 MHz.

* * * * *